United States Patent [19]

Brooks

[11] 4,447,068
[45] May 8, 1984

[54] BICYCLE DRIVE MECHANISM

[76] Inventor: Le Ester Brooks, 676 San Jose Ave., San Francisco, Calif. 94110

[21] Appl. No.: 322,869

[22] Filed: Nov. 19, 1981

[51] Int. Cl.³ .......................... B62M 9/00; F16H 1/12
[52] U.S. Cl. ..................................... 280/260; 74/194; 74/351; 280/238
[58] Field of Search ....................... 280/260, 236, 238; 74/351, 416, 194

[56] References Cited

U.S. PATENT DOCUMENTS

| | | | |
|---|---|---|---|
| 479,470 | 7/1892 | Smallwood | 280/260 |
| 624,964 | 5/1899 | Oberhammer | 280/260 |
| 649,878 | 5/1900 | Scharbach | 280/260 |
| 662,891 | 11/1900 | Copeland | 280/260 |
| 675,067 | 5/1901 | Nichols | 280/260 |
| 715,404 | 12/1902 | Markgraf | 74/351 |
| 2,378,634 | 6/1945 | Hussey | 280/260 |
| 2,475,654 | 7/1949 | Watson | 280/260 |
| 3,861,715 | 1/1975 | Mendoza | 280/260 |
| 3,934,481 | 1/1976 | Foster | 280/236 |
| 4,005,611 | 2/1977 | Jeffries | 280/236 |

*Primary Examiner*—Joseph F. Peters, Jr.
*Assistant Examiner*—Donn McGiehan
*Attorney, Agent, or Firm*—Paul L. Hickman

[57] ABSTRACT

An improved bicycle drive assembly characterized by an elongated, rotary drive shaft, a front gear assembly coupling the forward end of the drive shaft to the bicycle's crank-and-pedal assembly, a disk gear provided with a plurality of radial grooves on its outer face, a torque-shift gear assembly slidingly engaged to the drive shaft and keyed for mutual rotation therewith, and an adjustable spring assembly for biasing the torque-shift gear assembly towards the center of the disk gear. As the torque on the drive shaft is increased the torque-shift gear assembly is forced laterally out across the face of the disk gear to cause a down-shift in gear ratios. As the torque on the drive shaft decreases the spring assembly forces the torque-shift gear back towards the center of the disk gear to up-shift the gearing ratio.

11 Claims, 9 Drawing Figures

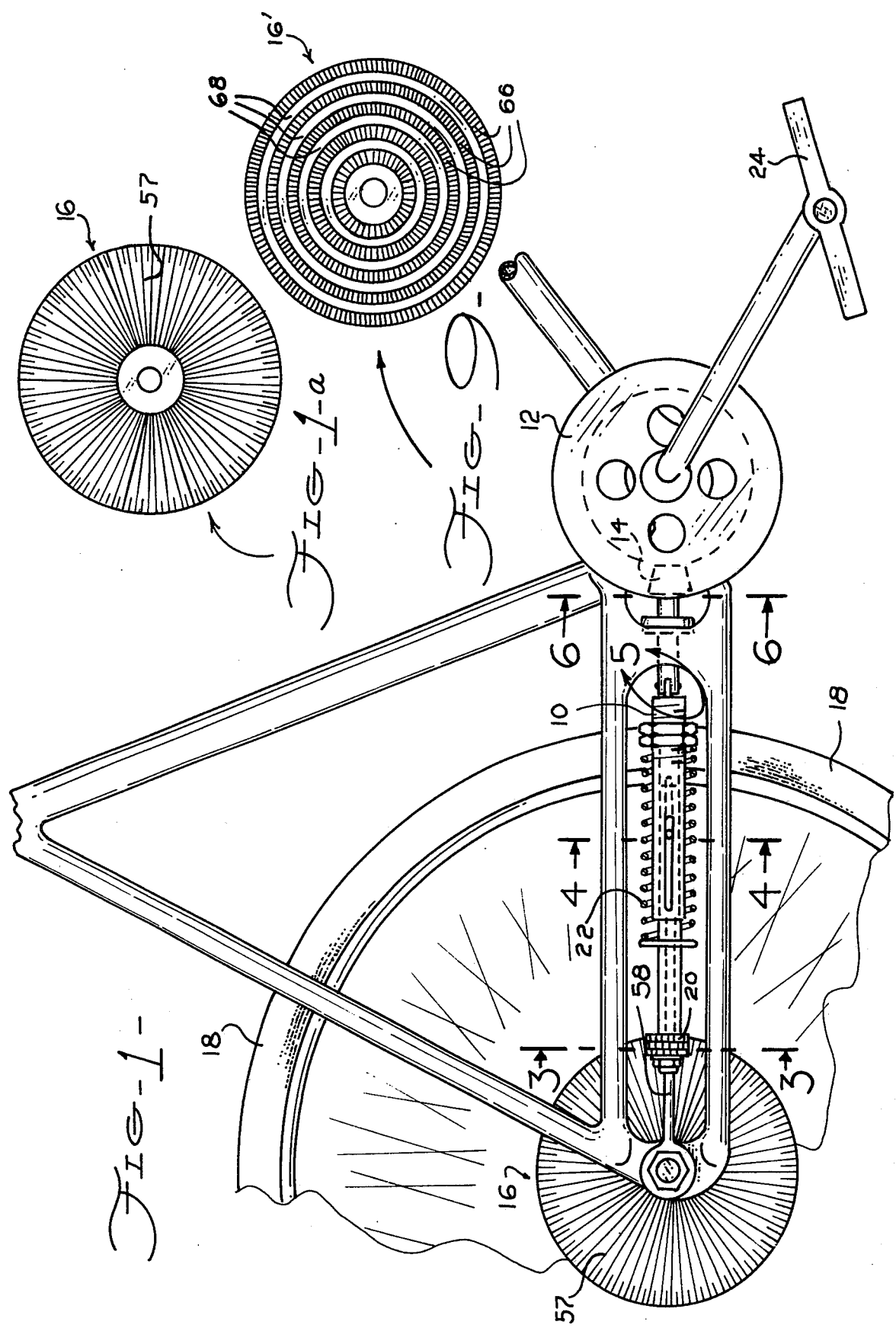

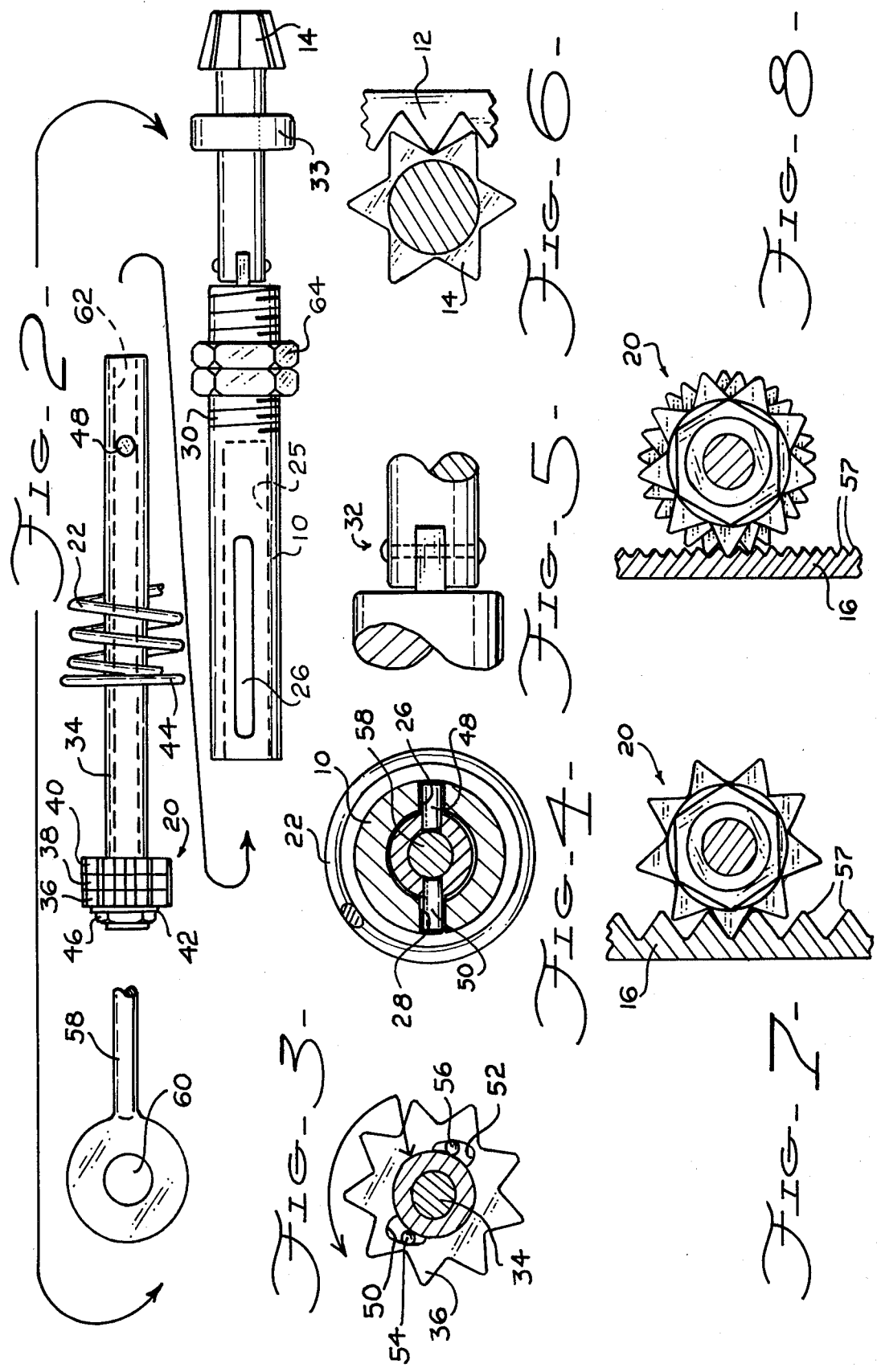

BICYCLE DRIVE MECHANISM

BACKGROUND OF THE INVENTION

1. Field of the Invention

This invention relates generally to bicycles and more particularly to bicycle drive mechanisms.

2. Description of the Prior Art

A standard bicycle has a drive mechanism including a crank-and-pedal assembly for rotating a front gear assembly, a rear gear assembly attached to the rear wheel, and a chain coupling the front gear assembly to the rear gear assembly. A mechanism is usually provided to change the gearing ratio of the bicycle.

One alternative to the chain-and sprocket drive mechanism described above is a drive shaft type mechanism including a front gear assembly coupled to a crank-and-pedal assembly, a rear gear assembly coupled to the rear wheel, and a rotary drive shaft coupling the front gear to the rear gear.

Various types of bicycle drive shaft mechanisms are described in U.S. Pat. Nos. 649,878 of Scharbach, 479,470 of Smallwood, 2,378,634 of Hussey, 624,964 of Oberhammer, 3,861,715 of Mendoza, 675,067 of Nichols, 662,891 of Copeland, and 2,475,654 of Watson. Scharbach's patent, which is typical of the above cited patents, describes a bicycle having a drive shaft R coupled at one end to a crank C and coupled at its outer end to a cog gearing ring H which engages a disk gear G attached to the rear axle. The cog gearing ring H is slidably attached to drive shaft R and is capable of axial movement along a portion of the drive shaft under the manual control of a rod $E^2$. Scharbach's gears are changed by adjusting rod $E^2$ to cause cog gearing ring H to move to one of cog gears $H^1$, $H^2$, or $H^3$.

A disadvantage of prior art bicycle drive shaft mechanisms is that the number of gearing ratios is limited. For example, in Scharbach's only three discrete gearing ratios are available, corresponding to cog gears $H^1$, $H^2$, and $H^3$. Due to engineering limitations of this type of disk gear, it is unlikely that very many more cog gears could be added to extend the gearing range.

Another disadvantage of the prior art is that the gearing ratios have to be changed manually. Besides being inconvenient for a bicycle rider to have to manually shift gears all the time, a manual gear shift often can not be used when the gears in mesh are under a heavy load, i.e. such as when a bicyclist is riding up a steep hill.

SUMMARY OF THE INVENTION

An object of this invention is to provide an improved drive assembly for a bicycle which is capable of developing a great number of gearing ratios.

Another object of this invention is to provide such a drive assembly which shifts gearing ratios automatically in response to the load demands.

Briefly, the invention includes an elongated drive shaft, a front gear assembly coupling the forward end of the drive shaft to the crank-and-pedal assembly of the bicycle, a disk gear coupled to the rear wheel, a torque-shift gear assembly slidingly engaged with the drive shaft and keyed for mutual rotation therewith, and an adjustable spring mechanism for biasing the torque-shaft gear assembly towards the center of the disk gear. The disk gear is provided with a number of evenly spaced, radial grooves with which the teeth of the torque-shift gear assembly engages.

The torque-shift gear assembly preferably includes a triplet of gears including a fixed gear which rotates with the drive shaft and a pair of clutch gears capable of rotation with the drive shaft. As the torque on the drive shaft increases the torque-shift gear assembly is forced laterally across the grooved face of the disk gear against the pressure of the biasing spring, down-shifting the gearing ratio. As the torque on the drive shaft decreases the biasing spring forces the torque-shift gear assembly back towards the center of the disk gear to up-shift the gearing ratio. The clutch gears automatically slip into their correct position as the torque-shift gear assembly moves laterally across the face of the disk gear.

An advantage of this invention is that the bicycle has a virtually continuous range of gearing ratios between a predetermined maximum and minimum. Furthermore, the gearing shifts automatically as the torque on the drive shaft increases, freeing the bicyclist from the troubles associated with manual shifting.

These and other objects and advantages of the present invention will no doubt become apparent upon a reading of the following descriptions and a study of the several figures of the drawing.

BRIEF DESCRIPTION OF THE DRAWING

FIG. 1 is a partial elevational view of a bicycle fitted with the present device.

FIG. 1a is an elevational view of the rear gear disk.

FIG. 2 is an exploded view of the drive mechanism shown in FIG. 1.

FIG. 3 is a cross sectional view taken along line 3—3 of FIG. 1.

FIG. 4 is a cross sectional view taken along line 4—4 of FIG. 1.

FIG. 5 is a cross sectional view top plan view taken along line 5—5 of FIG. 1.

FIG. 6 is a cross sectional view taken along line 6—6 of FIG. 1.

FIG. 7 is an end elevational view of the rear gears in a maximum torque position.

FIG. 8 is an end elevational view of the rear gears in a minimum torque position.

FIG. 9 is a front elevational view of an alternate embodiment for the rear gear disk.

DETAILED DESCRIPTION OF THE PREFERRED EMBODIMENT(S)

Referring to FIGS. 1 and 2, a bicycle drive assembly in accordance with the present invention includes a drive shaft 10, a front gear assembly including a front ring gear 12 and a beveled pinion 14, a disk gear 16 coupled to the rear wheel 18 of the bicycle, a torque-shift gear assembly 20, and a adjustment spring 22 urging gear assembly 20 towards the center of the disk gear. Ring gear 12 is attached to a crank-and-pedal assembly 24.

As best seen in FIGS. 2 and 4, the drive shaft is an elongated, structure provided with an elongated bore 25 and an opposing pair of longitudinal slots 26 and 28 opening on the bore. A portion of the drive shaft's outer surface is threaded at 30. The drive shaft should be constructed from a strong, durable material such as stainless steel or anodized aluminum. The frame of the bicycle is preferably bifurcated between the crank-and-pedal assembly and the rear axle as shown to accomodate the drive shaft.

As mentioned above, ring gear 12 is attached to and rotates with the crank-and-pedal assembly 24. Preferably, the ring gear has fifty teeth and a ½ inch pitch. While the ring gear is shown un-encased, it may be desirable in certain embodiments of this invention to enclose it within a suitably shaped cover.

Pinion 14 engages ring gear 12 (as seen in the cross sectional view of FIG. 6) and preferably has six teeth and a ½ inch pitch. The pinion is coupled to the end of drive shaft 10 by a flexible joint 32, shown in elevational view in FIG. 2 and plan view in FIG. 5, and is supported by a ball bearing support 33 attached to the bicycle frame.

The torque-shift gear assembly 20 includes a slide shaft 34, and three gears 36, 38, and 40 attached to the end of the slide shaft with a washer 42 and a nut 46. Shaft 34 telescopes within bore 25 of drive shaft 10 and rotates with the drive shaft due to the engagement of a pair of pins 48 and 50 (see FIGS. 2 and 4) with slots 26 and 28, respectively. Thus, the gear assembly 20 rotates with the drive shaft but is capable of restricted axial movement relative to the drive shaft.

Gear 40 is rigidly coupled to shaft 34 and thus must rotate with it and the drive shaft. As best seen in the sectional view of FIG. 3, gears 36 and 38 are clutch gears which, as will be discussed later, are capable of varying their rotational positions relative shaft 34 and 10 so as to adjust the gear assembly as it shifts along disk gear 16.

In FIG. 3, gear 36 is shown to be provided with a pair of bearing slots 50 and 52 within which a pair of ball bearings 54 and 56 are located. The gear is provided with a central bore receptive to shaft 34 with a close, loose fit. When shaft 34 has a greater counter-clockwise torque than the clutch gear the ball bearings will jam into the narrowed ends of the bearing slots and cause the gear to rotate with the shaft. When shaft 34 has a lesser counter-clockwise torque than the clutch gear the ball bearings will move to the widened ends of the bearing slots and the clutch gear will be able to rotate free of shaft 34. Gear 38 is of similar construction as gear 36.

Disk gear 16 is preferably attached to the bicycle wheel's freewheel. As seen in FIGS. 1, 1a, 7, and 8, the disk gear's outer face is provided with a plurality of evenly spaced, radial grooves 57 which engage the teeth of gears 36, 38, and 40. Preferably, the disk gear is provided with fifty-six 'V' shaped grooves spaced ½ inch apart at the circumference. As best seen in FIGS. 7 and 8, the depth of the grooves taper radially inwardly. Again, the disk gear should be constructed from a strong, durable material.

An elongated stabilizing pin 58 is provided to support the rearward end of the torque-shift gear assembly. The rearmost end of the stabilizing pin is widened and provided with a bore hole 60 receptive to the rear axle of the bicycle. The shaft of the stabilizing pin engages a bore hole 62 provided in shaft 34. Thus, stabilizing pin is telescoped within shaft 34, just as shaft 34 is telescoped within drive shaft 10. This allows the torque-shift gear assembly to move freely across the face of the disk gear and yet rotate with the drive shaft.

An adjustment nut 64 is engaged with threads 30 of the drive shaft. Nut 64 and a washer 44 attached to shaft 34 provide shoulders against which the spring 22 can bear in expansion. Thus, the spring biases the torque-shift gears away from the drive shaft and towards the center of the disk gear. The biasing force of the spring can be adjusted by nut 64 to suit the individual rider. For example, a heavier or stronger person would adjust the spring biasing force to a maximum, and a lighter or less strong person would adjust the spring biasing force to a minimum.

The postion of gears 36-40 depends upon the torque provided by the drive shaft. When there is no torque on the drive shaft the biasing spring pushes gears 36-40 to the center of the disk gear. An increase in torque on the drive shaft will produce a radial force on the gears 36-40 which tends to oppose the biasing force of the spring. The greater the torque supplied by the drive shaft, the farther out along the disk gear the gears 36-40 will ride.

FIG. 7 shows the gears 36-40 at a position of maximum drive shaft torque, i.e. near the circumference of the disk gear. Here the nine teeth of gears 36-40 engage all fifty-six grooves of the disk gear and thus the effective rear gear assembly gearing ratio is 9:56. This will produce a great deal of torque at the rear wheel and is useful for climbing hill, etc.

In FIG. 8 the gears 36-40 are shown at a position of minimum drive shaft torque, i.e. near the center of the disk gear. Here the nine teeth of gears 36-40 only engage about every $12^{th}$ groove in the disk gear producing an effective rear gear assembly gearing ratio of 9:12. This will cause the rear wheel to rotate rapidly, but will little torque. It will be noted that the clutch gears will rotate until to intermediate positions relative the fixed gear to engage some intermediate grooves of the disk gear. This will not change the gearing ratio. It will also be noted that only the tips of the teeth of gears 36-40 engage the shallow grooves 57 of the disk gear. This limited engagement is offset by the greater number of gear teeth engaging the disk gear and by the fact that the torque on the gears is relatively low at this position.

Between the positions shown in FIGS. 6 and 7, there is a continuous range of gearing ratios available. For the pitches and gear sizes described above the gearing ratio between the crank-and-pedal assembly and the wheel can be varied continuously from about 1:1 to about 1:6.

In FIG. 9 an alternate embodiment, referenced as 16', for the rear disk gear is shown. In this embodiment there are a number of concentric cog rings 66 of equal pitch (i.e. ½ inch pitch) but with, of course, different numbers of teeth. The cog rings are separated by planar sections 68 to facilitate in the shifting of the torque-shift gear assembly 20.

While this invention has been described in terms of a few preferred embodiments, it is contemplated that persons reading the preceding descriptions and studying the drawing will realize various alterations, permutations and modifications thereof. For example, there are many ways of attaching the torque-shifted gears to the drive shaft, such as having a splined drive shaft and torque-shifted gears provided with a splined hub receptive to the drive shaft. While such an embodiment might be more difficult to manufacture, it does have the advantage of having fewer component parts.

It is therefore intended that the following appended claims be interpreted as including all such alterations, permutations and modifications as fall within the true spirit and scope of the present invention.

What is claimed is:

1. In a bicycle including a frame, a crank-and-pedal assembly coupled to a lower portion of the frame, a rear wheel including a rear axle coupled to a rearward portion of the frame, and a drive mechanism coupling the crank-and-pedal assembly to the rear wheel, an improved drive assembly comprising:

(a) a drive shaft having a forward end and a rearward end;
(b) a front gear means coupling said forward end of said drive shaft to said crank-and-pedal assembly;
(c) a disk gear coupled to said rear wheel, said disk gear having an outer face provided with a plurality of evenly spaced, inwardly tapering radial grooves;
(d) a torque-shift gear assembly engaged with said drive shaft for mutual rotation therewith, said torque-shift gear assembly being capable of limited axial movement along said drive shaft while engaging said disk gear; and
(e) means biasing said torque-shift gear assembly towards the center of said disk gear.

2. An improved drive assembly as recited in claim 1 wherein said torque-shift gear assembly includes a fixed gear which rotates with said drive shaft and at least one clutch gear capable of rotation with said drive shaft.

3. An improved drive assembly as recited in claim 2 further comprising stabilizing means coupling said rearward end of said drive shaft to said rear axle.

4. An improved drive assembly as recited in claim 3 whereby the force exerted by said biasing means is adjustable.

5. An improved drive assembly as recited in claim 4 wherein said drive shaft is provided with a joint providing flexure in at least one direction.

6. An improved drive assembly as recited in claim 1 wherein said bicycle frame is bifurcated between said crank-and-pedal assembly and said rear axle to accomodate said drive shaft.

7. In a bicycle including a frame, a crank-and-pedal assembly coupled to a lower portion of the frame, a rear wheel including a rear axle coupled to a rearward portion of the frame, and a drive mechanism coupling the crank-and-pedal assembly to the rear wheel, an improved drive assembly comprising:
(a) a drive shaft having a forward end and a rearward end;
(b) a front gear means coupling said forward end of said drive shaft to said crank-and-pedal assembly;
(c) a disk gear coupled to said rear wheel, said disk gear having an outer face provided with a plurality of spaced, inwardly tapering radial grooves;
(d) a torque-shift gear assembly carried by said drive shaft and engaging said outer face of said disk gear, where the drive point on said disk gear by said gear assembly is dependent upon the torque applied to said drive shaft; and
(e) means biasing said torque-shift gear assembly towards the center of said disk gear.

8. An improved drive assembly as recited in claim 7 wherein said torque-shift assembly includes at least one gear which rotates with said drive shaft.

9. An improved drive assembly as recited in claim 7 wherein said means biasing said torque-shift gear assembly is adjustable.

10. An improved drive assembly as recited in claim 7 wherein said drive shaft is provided with a joint providing flexure in at least one direction.

11. In a bicycle including a frame, a crank-and-pedal assembly coupled to a lower portion of the frame, a rear wheel including a rear axle coupled to a rearward portion of the frame, and a drive mechanism coupling the crank-and-pedal assembly to the rear wheel, an improved drive assembly comprising:
(a) a drive shaft having a forward end and a rearward end;
(b) a front gear means coupling said forward end of said drive shaft to said crank-and-pedal assembly;
(c) a disk gear coupled to said rear wheel, said disk gear having an outer face provided with a plurality of separated, concentric cog gear rings;
(d) a torque-shift gear assembly carried by said drive shaft and engaging said cog gear rings, where the drive point on said disk gear by said gear assembly is dependent upon the torque applied to said drive shaft; and
(e) means biasing said torque-shift gear assembly towards the center of said disk gear.

* * * * *